United States Patent [19]

Casper

[11] Patent Number: 5,423,980
[45] Date of Patent: Jun. 13, 1995

[54] WASTEWATER TREATMENT APPARATUS WITH ICE RESISTANT ADJUSTABLE FRICTION DRIVE

[75] Inventor: Thomas J. Casper, Waukesha, Wis.

[73] Assignee: Envirex Inc., Waukesha, Wis.

[21] Appl. No.: 182,856

[22] Filed: Jan. 18, 1994

[51] Int. Cl.⁶ ............................................. B01D 21/20
[52] U.S. Cl. ................................... 210/175; 210/528; 210/530
[58] Field of Search .............. 210/175, 187, 523, 525, 210/528, 529, 530, 531

[56] References Cited

U.S. PATENT DOCUMENTS

| | | | |
|---|---|---|---|
| Re. 23,415 | 10/1951 | Nordell | 210/520 |
| 1,356,608 | 10/1920 | Dorr | 210/530 |
| 1,951,012 | 3/1934 | Finney | 210/530 |
| 1,951,462 | 3/1934 | Wing | 210/530 |
| 2,068,428 | 1/1937 | Moorehead | 210/530 |
| 2,223,257 | 11/1940 | Mallory | 210/530 |
| 2,249,049 | 7/1941 | Sayers et al. | 210/530 |
| 2,418,189 | 4/1947 | Nordell | 210/530 |
| 2,427,091 | 9/1947 | Durdin, III | 210/530 |
| 3,717,257 | 2/1973 | Boyle | 210/521 |
| 4,022,697 | 5/1977 | Pankuch | 210/530 |
| 4,175,041 | 11/1979 | Drnevich et al. | 210/188 |
| 4,367,141 | 1/1983 | Dorombozi et al. | 210/145 |
| 4,859,346 | 8/1989 | Wood | 210/776 |
| 4,978,447 | 12/1990 | Hall | 210/241 |
| 5,176,835 | 1/1993 | Perletti | 210/703 |

FOREIGN PATENT DOCUMENTS

2812525A1 10/1978 Germany .
6607038 8/1966 Netherlands .
502469 3/1939 United Kingdom .

*Primary Examiner*—Christopher Upton
*Attorney, Agent, or Firm*—Michael, Best & Friedrich

[57] ABSTRACT

A wastewater treatment apparatus comprising a generally circular tank having a wall; a rotatable driven bridge having one end positioned above the center of the tank and an opposite end supported above the tank wall; a sludge moving member supported by the bridge and movable in response to movement of the opposite end of the bridge along the tank wall; and a drive apparatus for moving the opposite end of the bridge along the tank wall. The drive apparatus includes a rail extending along the top of the wall, a frame supporting an end of the bridge, an idler wheel supporting the frame for movement along the top of the wall, a drive wheel rotatably supported on the frame, means for urging the drive wheel into frictional engagement with the surface of the rail, and a drive motor operably connected to the drive wheel for driving the drive wheel along the rail. Preferably, the means for urging the drive wheel is adjustable for controlling the frictional engagement of the drive wheel with the surface of the rail. The apparatus preferably further includes heating apparatus for heating one of the rail and drive wheel to prevent accumulation of ice and snow, and, more preferably, the heating apparatus includes the rail being a hollow member for containing heated fluid. Also, the surface of the rail and the drive wheel preferably are curved to provide a large surface area for frictional engagement of the rail and the drive wheel.

19 Claims, 3 Drawing Sheets

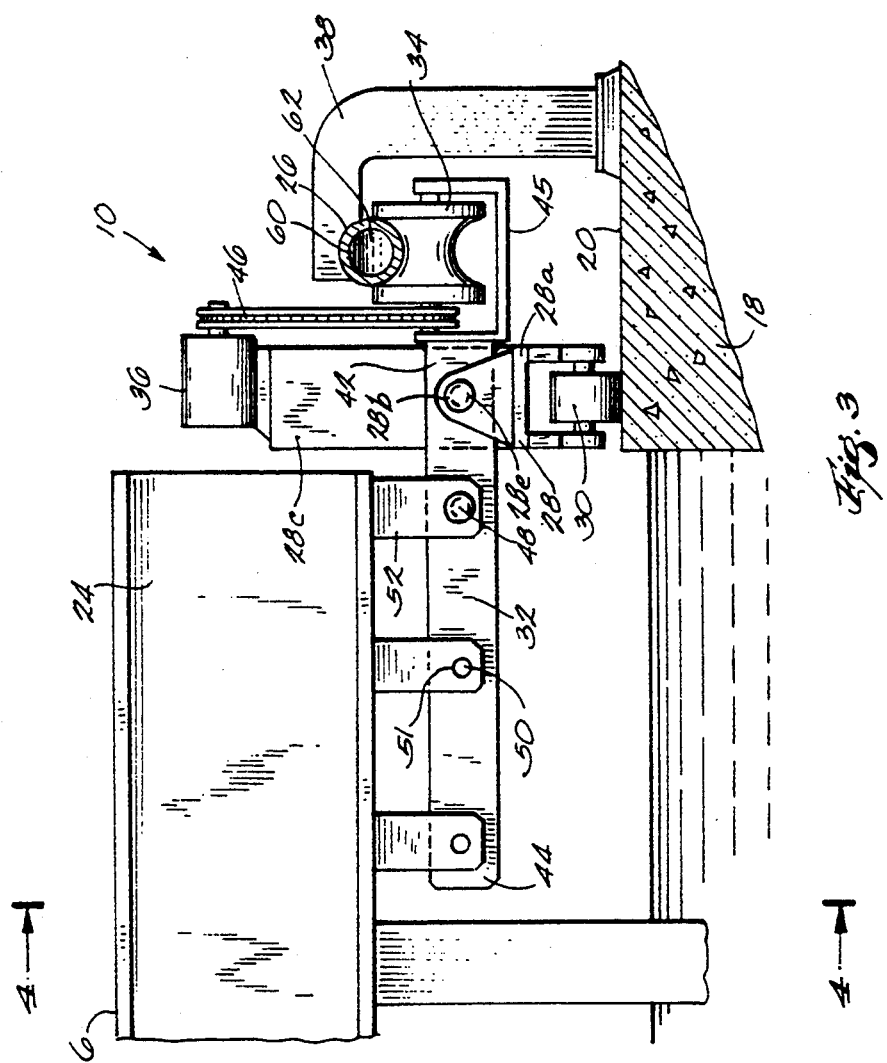
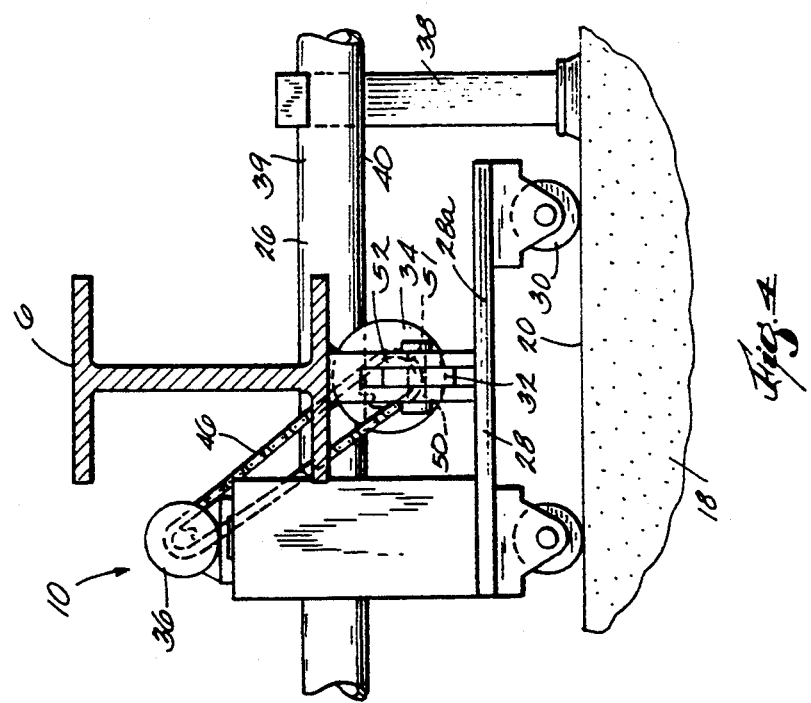

WASTEWATER TREATMENT APPARATUS WITH ICE RESISTANT ADJUSTABLE FRICTION DRIVE

BACKGROUND OF THE INVENTION

1. Field of the Invention

The invention relates to wastewater treatment apparatus, and, more particularly, to such apparatus including a drive apparatus for propelling a rotating bridge.

2. Reference to Prior Art

One common type of wastewater treatment apparatus for separating liquids and solids, frequently described as a clarifier, includes a generally circular wastewater treatment tank, a rotatable driven bridge, a sludge moving member supported by the bridge and a drive apparatus. The tank includes a wall having a top surface. The rotatable driven bridge includes one end supported above the center of the tank and an opposite end supported above the tank wall and is supported such that the opposite end of the bridge can move along the tank wall and rotate the bridge about the center. The sludge moving member is supported in the tank by the bridge and is movable in response to movement of the opposite end of the bridge along the tank wall. The drive apparatus for moving the bridge along the tank wall typically includes a frame supported by a pair of drive wheels. The frame supports the end of the bridge for movement along the top of the tank wall. The drive wheels rest on the top surface of the tank wall and support the frame for movement along the tank wall. A drive motor is operably connected to the drive wheels for driving the drive wheels along the top surface of the tank wall.

In such an arrangement, in order to move the bridge the drive wheels must have secure frictional engagement or traction with the top surface of the tank wall. When snow or ice accumulates on either the drive wheels or the top surface of the tank wall, traction declines. When traction declines, movement of the bridge may be interrupted, resulting in malfunction or shutdown of the wastewater treatment apparatus. Thus it is frequently necessary for the drive apparatus to include a cowling extending ahead of the drive wheels to push snow out of the path of the drive wheels. It is also necessary for personnel to scrape ice and snow accumulations from the top wall to improve traction. Spreading sand and salt on the tank wall is also frequently required to improve traction and minimize the rate of ice and snow accumulation.

U.S. Pat. No. 2,418,189 issued to Nordell relates to a clarifier for separating liquids and solids wherein a truss provided with a plurality of scraper blades is supported by two wheels on the upper side of a rail. A pinion engages a rack on the lower edge of the rail to move the truss.

U.S. Patent Reissue No. 23,415 also issued to Nordell relates to a traction drive wherein a wheel riding on the upper surface of a rail moves a rotating bridge. When the force required for moving the bridge is greater than can be secured by the wheel alone, a second wheel can be mounted in contact with the lower edge of the rail.

U.S. Pat. No. 4,859,346 issued to Wood relates to a traction drive which is mounted on a circular support base at ground level below and exterior of the vertical walls of an above ground tank. A continuous rail and rack are mounted on the base, and a wheel and pinion assembly are provided so that the wheel rolls on the rail and the pinion meshes with the rack.

German Patent 2,812,525 relates to a settling tank including a scraper drive trolley having drive wheels with V-shaped tread for straddling the top of a rail and crushing any ice which forms on the rail.

SUMMARY OF THE INVENTION

The invention provides a wastewater treatment apparatus including a rotatable bridge driven by an ice resistant drive apparatus, so that ice and snow accumulation does not prevent rotation of the bridge. The ice resistant drive apparatus avoids the application of materials such &s sand and salt, so that corrosion of the wastewater treatment apparatus does not occur.

The invention also provides a rotatable bridge driven by an adjustable friction drive apparatus with the degree of frictional engagement of the drive wheels being adjustable to accommodate different operating conditions.

Other features and advantages will become apparent to those skilled in the art upon review of the following drawings, detailed description and claims.

The invention provides a wastewater treatment apparatus including a generally circular wastewater treatment tank, a rotatable driven bridge, a sludge moving member supported by the bridge and a drive apparatus. The tank includes a wall having a top surface. The rotatable driven bridge includes one end supported above the center of the tank and an opposite end supported above the tank wall such that the opposite end of the bridge can move along the tank wall and rotate the bridge about the center. The sludge moving or removing member is supported in the tank by the bridge and is movable in response to movement of the opposite end of the bridge along the tank wall.

The drive apparatus for moving the bridge along the tank wall includes a rail extending along the top of the wall, a frame supported by an idler wheel and supporting the opposite end of the bridge for movement along the top of the wall, a drive wheel rotatably supported by a drive wheel mounting arm, means for urging the drive wheel upwardly for frictional engagement with the bottom surface of the rail, and a drive motor operably connected to the drive wheel for driving the drive wheel along the rail. In one embodiment of the invention, the opposite end of the bridge is supported on the frame and includes a pressure rod for urging the drive wheel upwardly. In another embodiment, the opposite end of the bridge is connected to the inner end portion of the drive wheel mounting arm for supporting the bridge and urging the drive wheel upwardly. In still another embodiment of the invention, the bridge is pivotally connected to the drive wheel mounting arm, and the distance between the pivotal connection of the drive wheel mounting arm to the frame and the pivotal connection of the drive wheel mounting arm to the bridge is adjustable to control the frictional engagement of the drive wheel with the bottom surface of the rail.

In one embodiment of the invention, the drive apparatus includes heating apparatus for heating either the rail or drive wheel to prevent accumulation of ice and snow. Preferably, the heating apparatus includes the rail being a hollow member for containing heated fluid.

BRIEF DESCRIPTION OF THE DRAWINGS

FIG. 3 is an enlarged view of the drive apparatus shown generally in FIG. 2.

FIG. 4 is a cross sectional view taken generally along line 4—4 in FIG. 3.

DETAILED DESCRIPTION OF A PREFERRED EMBODIMENT

Figure 2:
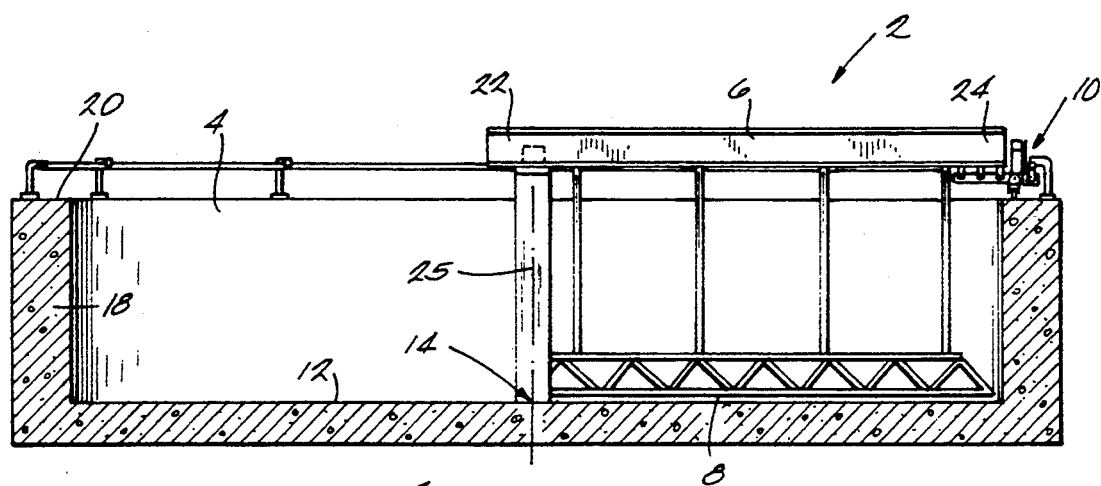
FIG. 2 is a cross sectional view taken generally along line 2—2 in FIG. 1.
Figure 1:
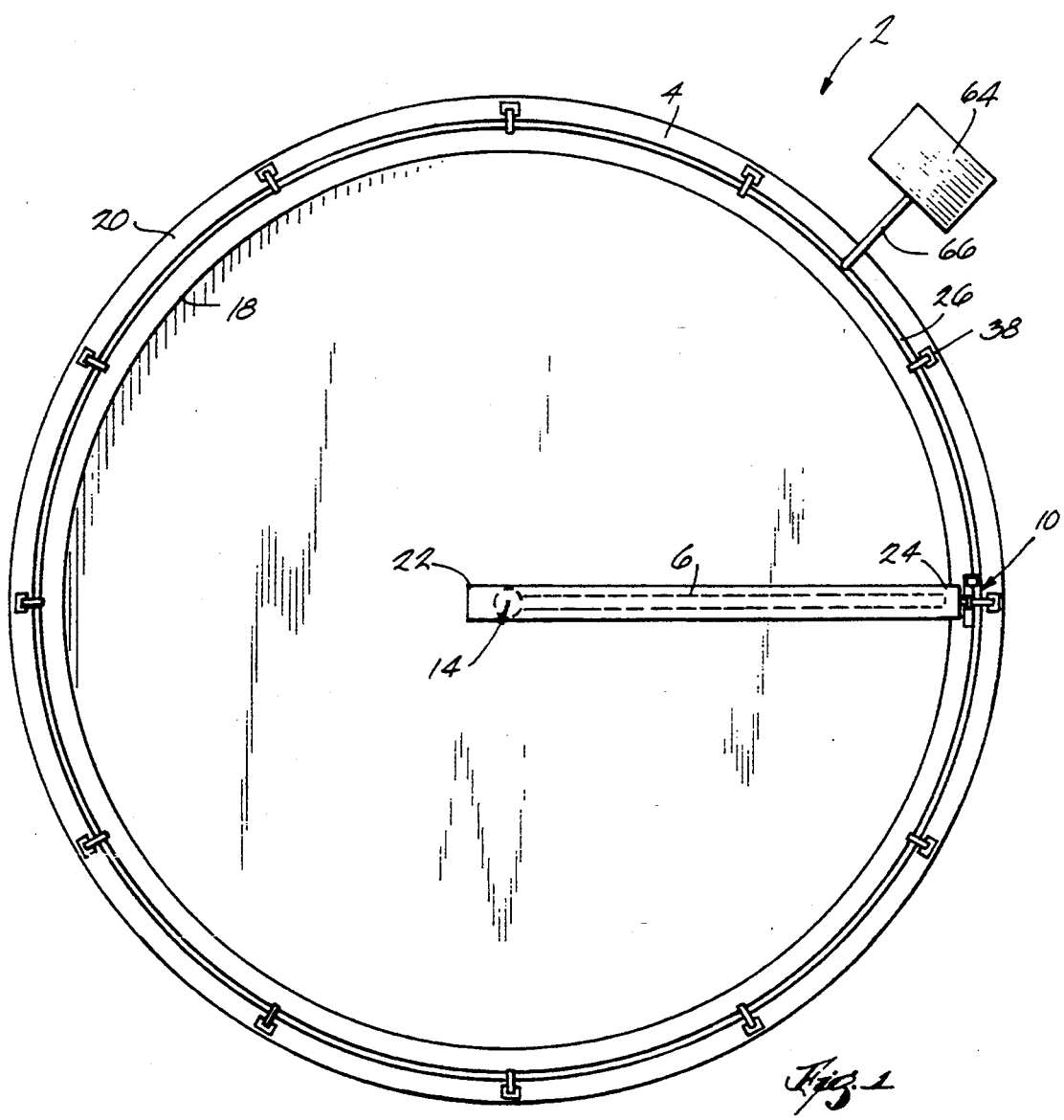
FIG. 1 is a top plan view of a wastewater treatment apparatus of the invention.

Illustrated in FIGS. 1 and 2 is a wastewater treatment apparatus 2 of the invention. The wastewater treatment apparatus 2 includes a generally circular wastewater treatment tank 4, a rotatable driven bridge 6, a sludge moving member 8, and a drive apparatus 10.

The wastewater treatment tank 4 includes a floor 12 having a center 14 and a wall 18 having a top surface 20. Wastewater and sludge are contained in the tank. Although other suitable materials could be used, in the illustrated embodiment of the invention the tank 4 is constructed from concrete. The bridge 6 includes an end 22 rotatably supported above the center 14 of the tank 4 and an opposite end 24 supported above the tank wall 18. While other arrangements for rotatably supporting the end 22 of the bridge 6 are possible, in the illustrated embodiment of the invention a support 25 extends upwardly from the floor 12 and rotatably supports the end 22. As described in detail below, the opposite end 24 of the bridge 6 is supported for movement along the tank wall 18 to rotate the bridge 6 about the support 25. In the illustrated embodiment of the invention, the bridge 6 is constructed of a pair of horizontally extending steel "H" beams or trusses.

The sludge moving member 8 is supported in the tank 4 by the bridge 6 and is movable in response to movement of the opposite end 24 of the bridge 6 along the tank wall 18. Although the sludge moving member 8 can include any member suitably adapted for moving or removing sludge, in the embodiment of the invention illustrated in FIGS. 1 and 2, the sludge moving member 8 includes a scraper blade supported for scraping sludge from the floor 12.

As shown most clearly in FIGS. 3 and 4, the drive apparatus 10 for moving the opposite end 24 of the bridge 6 along the tank wall 18 includes a fixed rail 26, movable frame 28, idler wheels 30, drive wheel mounting arm 32, drive wheel 34, and drive motor 36. The rail 26 is rigidly supported by rail supports 38 to extend along and above the top surface 20 of the wall 18. As described in detail below, the rail 26 includes an upper surface 39 and a bottom surface 40 spaced above the top surface 20 of the wall 18. Although other suitable materials could be used, in the illustrated embodiment of the invention the rail 26 is constructed from steel. A pair of idler wheels 30 contact the wall top surface 20 and support the frame 28 for movement along the tank wall 18. While the frame 28 can be constructed differently, in the embodiment of the invention illustrated in FIGS. 1-4, the frame 28 includes a horizontally extending frame beam 28a supported above the idler wheels 30, a first pivotal connection apparatus 28b on the beam 28a, and a drive motor mounting portion 28c also mounted on the beam 28a.

The drive wheel 34 is mounted on a pivotable drive wheel mounting arm 32. The drive wheel mounting arm 32 includes opposed outer and inner end portions 42,44 and is pivotally connected to the frame beam 28a by the first pivotal connection apparatus 28b intermediate the end portions 42,44. The first pivotal connection apparatus 28b can include any suitable connector, and in the illustrated embodiment of the invention is a pin pivotally engaging an aperture in the drive wheel mounting arm 32 and an aperture 28e in the frame beam 28.

The drive wheel 34 is rotatably supported by a U-shaped bracket 45 fixed to the outer end 42 of the drive wheel mounting arm 32 for frictional engagement with the bottom surface 40 of the rail 26. The drive motor 36 is operably connected to the drive wheel 34 for selectively driving the drive wheel 34 along the rail 26. Although the drive motor 36 may be connected to the drive wheel 34 in any suitable manner, in the embodiment of the invention shown in FIGS. 1-4, the drive motor 36 is connected to the drive wheel 34 by a chain and sprocket assembly 46.

The opposite end 24 of the bridge 6 is supported by the drive apparatus 10 for movement along the top 20 of the tank wall 18. Although they may be connected differently, in the embodiment of the invention illustrated in FIGS. 1-4, the opposite end 24 of the bridge 6 is connected to the inner end portion 44 of the drive wheel mounting arm 32 by second pivotal connection apparatus 48. Although different connection apparatus can be used, in the illustrated embodiment of the invention, the second pivotal connection apparatus is a pin 48 pivotally housed in one of a plurality of horizontally spaced first apertures 50 in the drive wheel mounting arm 32 and one of a plurality of horizontally spaced second apertures 51 in U-shaped brackets 52 on the bridge 6. Although the distance between the first and second pivotal connections 28b,48 may be fixed, in the embodiment of the invention illustrated in FIGS. 1-4, the distance 28b-48 between the first pivotal connection 28b of the drive wheel mounting arm 32 to the frame beam 28a and the second pivotal connection 48 of the bridge 6 to the drive wheel mounting arm 32 is adjustable by selecting different first and second apertures 50,51 for connection by the second pivotal connection apparatus 48. Adjusting the distance 28b-48 between the first and second pivotal connections 28b,48 controls the frictional engagement of the drive wheel 34 with the bottom surface 40 of the rail 26. When the distance 28b-48 is relatively small, the upward force exerted by the drive wheel 34 against the bottom surface 40 of the rail 26 is relatively small, so that the corresponding frictional engagement of the drive wheel 34 with the bottom surface 40 is also small. When the distance 28b-48 is increased, the upward force and corresponding frictional engagement increase.

As the drive wheel 34 is turned by the drive motor 36, the drive wheel 34 frictionally engages the bottom surface 40 of the rail 26 and moves the opposite end 24 of the bridge 6 along the tank wall 18. While different configurations of the rail 26 and drive wheel 34 are possible, in the embodiment of the invention illustrated in FIGS. 1-4, the bottom surface 40 of the rail 26 and the drive wheel 34 are curved in a complementary manner so that a large surface area of the bottom surface 40 is contacted by the drive wheel 34. The curvature of the bottom surface 40 and drive wheel 34 provide increased frictional engagement compared to flat surfaces. Although other materials, such as nylon, which are resistant to the adhesion of ice could be used, in the illustrated embodiment of the invention the drive wheel 34 is constructed from polyurethane to facilitate frictional engagement with the bottom surface 40.

Although the illustrated configuration minimizes the accumulation of falling snow and ice that might otherwise hinder frictional engagement between the bottom surface 40 and the drive wheel 34, preferably the rail 26 and drive wheel 34 are heated to resist accumulation of ice and snow. While other arrangements are possible for heating the rail 26 and drive wheel 34, in the embodiment of the invention illustrated in FIGS. 1–4 the rail 26 is a hollow tubular member having an internal cavity 60 for containing a heated fluid 62. The heated fluid 62, which may be gaseous or liquid, preferably is heated air and more preferably is a heat transfer liquid. As shown generally in FIG. 1, the fluid 62 is heated in a heater 64, introduced into the rail cavity 60 through piping 66, and circulated through the internal cavity 60 to heat the rail 26.

Figure 5:
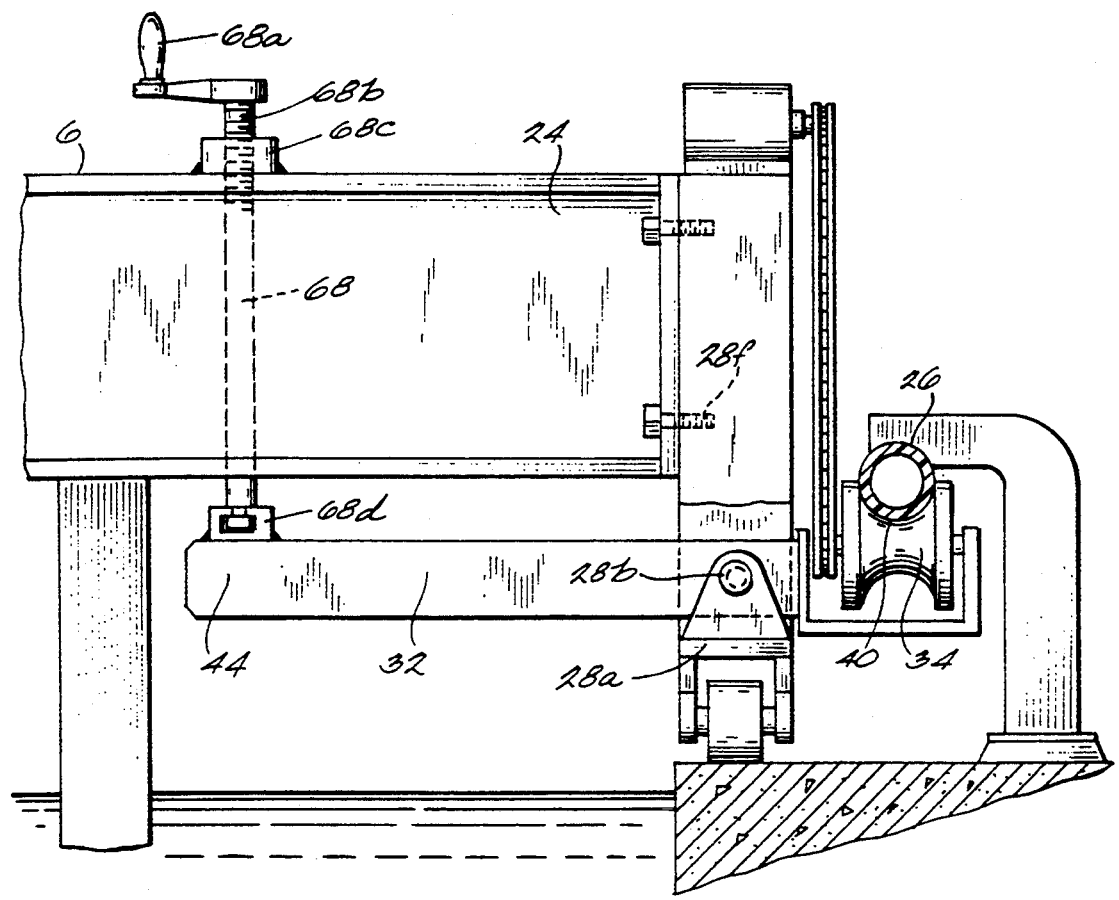
FIG. 5 is an enlarged view of the drive apparatus in a second embodiment of the invention.

Illustrated in FIG. 5 is a second embodiment of a drive apparatus 10. In the embodiment illustrated in FIG. 5, the opposite end 24 of the bridge 6 is fixedly supported on the frame beam 28a by bridge mounting apparatus 28f. The drive wheel mounting arm 32 is pivotally connected to the frame beam 28a at first pivotal connection 28b, and a vertically extending pressure rod 68 on the bridge 6 engages the inner end portion 44 of the drive wheel mounting arm 32. The pressure rod 68 includes a handle 68a and is threadably mounted on the bridge 68 by threads 68b and a threaded connector 68c. The end of the rod 68 engages the mounting arm 32 at a second connector 68d. The length of the rod 68 extending below the bridge 6 can be adjusted by moving the handle 68a to control the amount of downward pressure on the inner end portion 44 of the drive wheel mounting arm 32 and thereby control the frictional engagement of the drive wheel 34 with the bottom surface 40 of the rail 26. In other embodiments of the invention (not shown), the drive wheel 34 may be urged upwardly by weights, springs or other suitably adapted urging means connected to the drive wheel mounting arm 32 or drive wheel 34.

I claim:

1. A wastewater treatment apparatus comprising:
a generally circular wastewater treatment tank, the tank including a wall having a top surface, and the tank including a center;
a rotatable driven bridge having one end positioned above the center of the tank and an opposite end supported above the tank wall, the rotatably driven bridge being supported for movement such that the opposite end of the bridge can move along the tank wall;
a sludge moving member supported in the tank by the bridge and movable in response to movement of the opposite end of the bridge along the tank wall; and
a drive apparatus for moving the opposite end of the bridge along the tank wall, the drive apparatus including
a rail extending along the top of the wall and rigidly supported, the rail including a surface,
a frame for supporting the opposite end of the bridge,
an idler wheel supporting the frame for movement along the top of the wall,
a drive wheel rotatably supported on the frame,
means for urging the drive wheel into frictional engagement with the surface of the rail, said urging means including means for pivotally connecting the bridge to the frame for pivotal movement about a generally horizontal pivot axis, and
a drive motor operably connected to the drive wheel for selectively driving the drive wheel along the rail.

2. The apparatus according to claim 1 and wherein the means for urging the drive wheel is adjustable for controlling the frictional engagement of the drive wheel with the surface of the rail.

3. The apparatus according to claim 1 and further including heating apparatus for heating one of the rail and drive wheel to prevent accumulation of ice.

4. The wastewater treatment apparatus according to claim 3 and wherein the heating apparatus includes the rail being a hollow member for containing heated fluid.

5. The wastewater treatment apparatus according to claim 1 and wherein the surface of the rail and the drive wheel are curved to provide a large surface area for frictional engagement of the rail and the drive wheel.

6. A wastewater treatment apparatus comprising:
a generally circular wastewater treatment tank, the tank including a wall having a top surface, and the tank including a center;
a rotatable driven bridge having one end positioned above the center of the tank and an opposite end supported above the tank wall, the rotatably driven bridge being supported for movement such that the opposite end of the bridge can move along the tank wall;
a sludge moving member supported in the tank by the bridge and movable in response to movement of the opposite end of the bridge along the tank wall; and
a drive apparatus for moving the opposite end of the bridge along the tank wall, the drive apparatus including
a rail extending along the top of the wall and rigidly supported, the rail including a surface,
a frame supporting the opposite end of the bridge,
an idler wheel supporting the frame for movement along the top of the wall,
a drive wheel mounting arm having opposed outer and inner end portions, the drive wheel mounting arm being pivotally connected to the frame intermediate the end portions of the drive wheel mounting arm, said drive wheel mounting arm being pivotally movable with respect to the frame about a generally horizontal axis,
a drive wheel rotatably supported at the outer end portion of the drive wheel mounting arm and in frictional engagement with the surface of the rail,
means for urging the drive wheel into frictional engagement with the surface of the rail, and
a drive motor operably connected to the drive wheel for selectively driving the drive wheel along the rail.

7. The apparatus according to claim 6 and wherein the bridge is connected to the inner end portion of the drive wheel mounting arm such that the bridge applies force to the inner end portion of the drive wheel mounting arm.

8. The apparatus according to claim 7 and wherein the amount of force applied to the inner end portion of the drive wheel mounting arm is adjustable for controlling the frictional engagement of the drive wheel with the surface of the rail.

9. The apparatus according to claim 6 and further including heating apparatus for heating one of the rail and drive wheel to prevent accumulation of ice.

10. The wastewater treatment apparatus according to claim 9 and wherein the heating apparatus includes the rail being a hollow member for containing heated fluid.

11. The wastewater treatment apparatus according to claim 6 and wherein the surface of the rail and the drive wheel are curved to provide a large surface area for frictional engagement of the rail and the drive wheel.

12. A wastewater treatment apparatus comprising:
a generally circular wastewater treatment tank, the tank including a wall having a top surface, and the tank including a center;
a rotatable driven bridge having one end positioned above the center of the tank and an opposite end supported above the tank wall, the rotatably driven bridge being supported for movement such that the opposite end of the bridge can move along the tank wall;
a sludge moving member supported in the tank by the bridge and movable in response to movement of the opposite end of the bridge along the tank wall; and
a drive apparatus for moving the opposite end of the bridge along the tank wall, the drive apparatus including
a rail extending along the top of the wall and rigidly supported, the rail including a surface,
a frame,
an idler wheel supporting the frame for movement along the top of the wall,
a drive wheel mounting arm having opposed outer and inner end portions, the drive wheel mounting arm being pivotally connected to the frame intermediate the opposed end portions of the drive wheel mounting arm and for pivotal movement about a generally horizontal axis,
a drive wheel rotatably supported at the outer end portion of the drive wheel mounting arm for frictional engagement with the surface of the rail,
the inner end portion of the drive wheel mounting arm being connected to the opposite end of the bridge and supporting the opposite end of the bridge, and
a drive motor operably connected to the drive wheel for selectively driving the drive wheel along the rail.

13. The apparatus according to claim 12 and further including pivotal connection apparatus for pivotally connecting the opposite end of the bridge to the drive wheel mounting arm.

14. The apparatus according to claim 13 and wherein the distance between the pivotal connection of the drive wheel mounting arm to the frame and the pivotal connection of the drive wheel mounting arm to the opposite end of the bridge is adjustable to control the frictional engagement of the drive wheel with the surface of the rail.

15. The wastewater treatment apparatus according to claim 14 and wherein the pivotal connection apparatus includes a plurality of spaced apart first apertures in the drive wheel mounting arm, a plurality of spaced apart second apertures in the opposite end of the bridge, and a pivot member for pivotally engaging a first aperture and a second aperture.

16. The apparatus according to claim 12 and further including heating apparatus for heating one of the rail and drive wheel to prevent accumulation of ice.

17. The wastewater treatment apparatus according to claim 16 and wherein the heating apparatus includes the rail being a hollow member for containing heated fluid.

18. The wastewater treatment apparatus according to claim 12 and wherein the surface of the rail and the drive wheel are curved to provide a large surface area for frictional engagement of the rail and the drive wheel.

19. A wastewater treatment apparatus comprising:
a tank including a wall having a top surface;
a bridge;
means for supporting said bridge for movement along the wall of the tank;
a drive apparatus for moving the bridge along the tank wall, the drive apparatus including
a member extending along the tank wall and defining a second surface, said second surface being spaced from said top surface of the wall of the tank,
a drive wheel rotatably supported by one of said bridge and said means for supporting said bridge,
means for urging the drive wheel into frictional engagement with said second surface said urging means including means for pivotally connecting said bridge or said means for supporting said bridge to the drive wheel for pivotal movement about a generally horizontal axis, and
a drive motor operably connected to the drive wheel for selectively driving the drive wheel along the second surface.

* * * * *